United States Patent
Chao et al.

(10) Patent No.: US 6,864,321 B2
(45) Date of Patent: Mar. 8, 2005

(54) HYDROXYL-TERMINATED POLYBUTADIENES AND THEIR USE IN CURING FORMULATIONS

(75) Inventors: Herbert Chao, Paoli, PA (US); Nan Tian, Wilmington, DE (US); Alain Drexler, Philadelphia, PA (US); John Schmidhauser, Paoli, PA (US)

(73) Assignee: Sartomer Technology Co., Inc., Wilmington, DE (US)

( * ) Notice: Subject to any disclaimer, the term of this patent is extended or adjusted under 35 U.S.C. 154(b) by 0 days.

(21) Appl. No.: 10/732,732

(22) Filed: Dec. 10, 2003

(65) Prior Publication Data

US 2004/0122176 A1 Jun. 24, 2004

Related U.S. Application Data

(62) Division of application No. 10/205,752, filed on Jul. 26, 2002, now Pat. No. 6,747,097.
(60) Provisional application No. 60/308,034, filed on Jul. 26, 2001.

(51) Int. Cl.[7] .............................. C08F 8/00; C08L 33/14
(52) U.S. Cl. ...................... 525/192; 525/193; 525/194; 525/197; 525/198; 525/232
(58) Field of Search ................................ 525/192, 193, 525/194, 197, 198, 232

(56) References Cited

U.S. PATENT DOCUMENTS

| | | |
|---|---|---|
| 4,130,606 A | 12/1978 | Van Ballegoouen et al. |
| 4,462,678 A | 7/1984 | Funukawa et al. |
| 5,585,441 A | 12/1996 | Brandes et al. |
| 6,306,963 B1 | 10/2001 | Lane et al. |

OTHER PUBLICATIONS

A. G. Ajaz, Hydroxyl–Terminated Polybutadiene Telechelic Polymer (HTPB): Binder for Solid Rocket Propellants, Rubber Chemistry and Technology, vol. 68 Nov. 1994.

*Primary Examiner*—Nathan M. Nutter
(74) *Attorney, Agent, or Firm*—Cozen O'Connor, P.C.; Michael B. Fein, Esq.

(57) ABSTRACT

Compositions comprising (A) non-branched polybutadiene having terminal hydroxyl functionality less than 2 per molecule by average; and (B) branched polybutadiene having terminal hydroxyl functionality more than 2 per molecule by average; the weight ratio of (A) to (B) being about 99:1 to 1:99. These compositions are reacted with organic polyisocyanates to form prepolymers which are cured by reaction with a chain extender such as a diol to produce cured resins which exhibit unexpectedly improved tear strength properties and themoplasticity with high modulus, and improved tackiness and shelf life for hot melt adhesives. The prepolymers have lower viscosity and better storage stability as compared with those from conventional branched polybutadienes of the (B) type. Alternatively, the compositions can be cured directly in a one-shot reaction with diisocyanates to form a polyurethane with the described combination of properties. In addition, the compositions of (A) and (B) can be reacted to form polybutadienes with carboxyl, amine or epoxy-terminal functionality with are useful components of formulations.

14 Claims, No Drawings

HYDROXYL-TERMINATED POLYBUTADIENES AND THEIR USE IN CURING FORMULATIONS

CROSS-REFERENCE TO RELATED APPLICATIONS

This application is a Divisional application of Ser. No. 10/205,752, filed Jul. 26, 2002, and now U.S. Pat. No. 6,747,097, which claims benefit there of U.S. Provisional Patent Application No. 60/308,034, filed Jul. 26, 2001, is claimed.

BACKGROUND OF THE INVENTION

This invention relates to hydroxyl-terminated polybutadiene compositions, curable compositions comprising such hydroxyl-terminated polybutadienes, resin products made by reacting such hydroxyl-terminated polybutadienes with polyisocyantes, epoxy resins, anhydrides, amines, or phenolics, and cured polymers based on such formulations such as polyurethanes.

Prior hydroxyl-terminated polybutadienes prepared by radical polymerization, such as commercially available ones sold under the designations Poly bd R45HTLO or Liquiflex P, contain a large percentage of oligomers and polymers with branched microstructures and more than 2.0 hydroxyl functionalities per molecule, with an average functionality of such polybutadienes is about 2.4–2.6 hydroxyl groups per polymer molecule. Polyurethane formulations prepared from such branched hydroxyl-terminated polybutadienes reacted with polyisocyanates exhibit low tensile and tear strength properties.

Prior hydroxyl-terminated polybutadienes derived from anionic polymerization, such as Krasol® LBH 2000, 3000 and 5000, and the Nisso-G series have a non-branched structure and a maximum of 2.0 hydroxyl functionalities per chain, typically 1.8–1.9 hydroxyl groups per polymer chain. Such non-branched hydroxyl-terminated polybutadienes have been used in the prior art for reaction with organic polyisocyanates, to form polyurethanes or urethane-terminated prepolymers.

It has been a longstanding objective of those skilled in this art to form polyurethanes with improved and unique combination of properties, and to form prepolymers with lower viscosity and with improved storage stability thereof.

It has also been an objective in this art to improve the thermoplasticity and modulus of the chain extended cured resins of this type.

SUMMARY OF THE INVENTION

These objects, and others which will become apparent from the following disclosure, are achieved by the present invention which in one aspect comprises a composition comprising (A) non-branched hydroxyl-terminated polybutadiene having hydroxyl functionality lower than 2 per molecule by average; and (B) hydroxyl-terminated polybutadiene having hydroxyl functionality greater than 2 per molecule by average, the weight ratio of (A) to (B) being about 99:1 to 1:99. Preferably the weight ratio is 90:10 to 10:90.

In another aspect the invention comprises mixtures of (A) and (B) with an organic polyisocyanate to form polyurethane resins, isocyanate-terminated prepolymers prepared from such mixture or chain extended thermoplastic resins prepared by reacting the isocyanate terminated prepolymers with a chain extender such as a diol.

In another aspect, the invention comprises reaction products of the mixtures of (A) and (B) with anhydrides to form carboxyl-terminated prepolymers, with peracids to form epoxy-functionalized resins, with epoxy resins to form epoxy-terminated prepolymers, with phenolics to form phenol-terminated prepolymers, or with amines to form amine-terminated polymers, all or which are curable by reacting with chain extenders or curing agents.

Another aspect of the invention is direct cured polyurethane resins prepared by reacting an organic polyisocyanate with a mixture of (A) and (B).

In still another aspect, the invention comprises a method of preparing hydroxyl-terminated polybutadienes by blending types (A) and (B) in a ratio of 99:1 to 1:99 by weight, and of preparing prepolymers therefrom and of preparing cured resins from the prepolymers.

DETAILED DESCRIPTION OF THE INVENTION

Suitable non-branched hydroxyl-terminated polybutadienes (A) are low molecular weight resins, preferably having a weight average molecular weight, Mw, of about 1000 to 20,000, more preferably about 2000 to 10,000, and a 1,2-vinyl content of about 15–90 mole percent, preferably 20 to 70 mole %, with an average hydroxyl functionality less than or equal to 2 per molecule. These non-branched polybutadienes are preferably derived from anionic polymerization. The hydroxyl groups can be primary or secondary. Krasol® LBH 2000, 3000 and 5000, and the Nisso-G series are examples of such non-branched hydroxyl-terminated polybutadienes.

Suitable branched hydroxyl-terminated polybutadienes (B) are also low molecular weight resins, with a preferred number average molecular weight, Mn, of about 1000 to 20,000, more preferably about 2000 to 10,000, and have a 1,2-vinyl content of about 15–90 mole percent, preferably 20 to 70 mole % and an average hydroxyl functionality of more than 2.0, preferably about 2.4–2.6 per molecule. These branched polybutadienes are preferably derived from radical polymerization. The hydroxyl groups can be primary, secondary, or tertiary. Poly bd R45HTLO, Poly bd R45M, Poly bd R20LM, Liquiflex® H, and Liquiflex® P are examples of such branched hydroxyl-terminated polybutadienes.

The hydroxyl-terminated polybutadiene mixture compositions can further comprise hydrogenated branched or non-branched hydroxyl-terminated polybutadiene which results in improved high temperature stability with lower concentration of unsaturation. Hydrogenated hydroxyl-terminated polyisoprene, such as Epol® resin, can also be used as the branched hydroxyl-terminated polybutadiene.

The hydroxyl-terminated polybutadiene mixtures of (A) and (B) and any additional polybutadienes can be mixed with polyisocyanate and reacted to form isocyanate-terminated polyurethane prepolymers which can be further reacted with chain extenders to form resins which have good tensile and tear strength but with, surprisingly, similar modulus when compared with polyisocyanates prepared from (B) alone, as is typical in the prior art.

Suitable polyisocyanates are those with two or more isocyanate groups per molecule on average, for example 4,4'-methylenebis(phenyl isocyanate) (MDI), toluene diisocyanate (TDI), hexane diisocyanate, and others as are well known in this art.

The cured polyurethane of the invention exhibit greatly improved tensile and tear strength properties compared to the polyurethanes made from radical produced hydroxyl-terminated polybutadienes having terminal hydroxyl functionality of 2.4 to 2.6, but have high moduli compared to polyurethanes made from the anionic-produced hydroxyl-terminated polybutadienes.

The cured polymers are characterized by exceptional flexibility and toughness and high modulus properties. Moreover, they possess excellent water resistance and superior low dielectric properties. This combination of properties is not achievable with compositions of the prior art.

While the urethane polymers and isocyanate-terminated prepolymers cured with diols are preferred uses of the types of resins of the invention, the hydroxyl-terminated polybutadienes can also be reacted to form carboxyl, phenol, epoxy or amine-terminated polybutadienes, which can be cured to produce resins which also exhibit the improved properties. The cured thermoplastic resins are useful in a wide variety of applications such as coatings, adhesives, membranes, brake fluids, for example.

EXAMPLES

In the following examples, components in Tables (A), (B), (C) and (D) were used in the experiments.

Table (A)—Non-Branched Hydroxyl Terminated Polybutadienes Having Hydroxyl Functionality Below or Equal 2

A-2 Krasol® LBH 2000—hydroxyl-terminated butadiene polymer having about 1.8 to 1.9 hydroxyl groups per molecule and number average molecular weight, Mn, of about 2000.

A-3 Krasol® LBH-3000—hydroxyl-terminated butadiene polymer having about 1.8 to 1.9 hydroxyl groups per molecule and number average molecular weight, Mn, of about 3000.

A-4 Krasol® LBH-5000—hydroxyl-terminated butadiene polymer having about 1.8 to 1.9 hydroxyl groups per molecule and number average molecular weight, Mn, of about 5000.

Table (B)—Branched Hydroxyl-Terminated Polybutadienes Having Hydroxyl Functionality Above 2

B-2 Epol®—hydroxyl-terminated hydrogenated 1,4-polybutadiene manufactured by Idemitsu Petrochemical Co., Ltd., Japan having a hydroxyl functionality of 2.4.

B-3 Poly bd® R45HTLO—hydroxyl-terminated polybutadiene having an average molecular weight of 2400 available from Sartomer Company having a hydroxyl value of 0.84 meq/gram and a terminal hydroxyl functionality of 2.4 to 2.6.

Table (C)—Organic Polyisocyanates

C-1—Isonate 143L—4,4'-methylenebis(phenyl isocyanate) (MDI)

C-2—toluene diisocyanate (TDI)

C-2—hexane diisocyanate

Table (D)—Chain Extenders

D-1—2-Ethyl-1,3-Hexandiol (EHD)

Polyurethane Gumstock Properties (Examples 1–13)

Preparation of polyurethane sheets. Polyurethane mixtures were prepared by adding Isonate 143L to vacuum-degassed Poly bd R45HTLO, Krasol LBH, or a blend of the two resins. The molar ratio of NCO to OH was maintained at 1.05 for all the mixtures. Polyurethane sheets were then made by spreading the mixture in a 10"×5"×⅛" open mold. The polyurethane materials made with the reduced functionality polyols were compared with those derived from the standard B-3. All the samples were prepared without catalyst. Properties are reported in Tables 1–4.

TABLE 1

(Comparative) Physical Properties of Polyurethanes Derived from A Single Polyol

| | Example | | | |
|---|---|---|---|---|
| | 1 | 2 | 3 | 4 |
| Polyol | B-3 | A-2 | A-3 | A-4 |
| Tensile strength at break (psi) | 97.8 | 405.4 | 178.8 | 246.5 |
| Elongation at break (%) | 58.5 | 758.0 | 398.0 | 1004.0 |
| Modulus (psi) | 264.1 | 102.7 | 213.2 | 135.3 |
| Tear strength (lbf/in) | 23.6 | 67.2 | 75 | 66.8 |
| Hardness (Shore A) | 49 | 51 | 49 | 44 |

Mechanical Testing

The cured samples were further aged for a week at ambient temperature before being tested. Instron automated materials tester (model 4301) was used for measuring the physical properties of polyurethane sheets at 73° F. and 50% humidity. Tensile strength, elongation and Young's modulus were obtained by following the ASTM D638 protocol. Tear resistance was measured using Rubber Tear Test—US Customary Units. The crosshead pulling speed during the test was set at 2.0 in/min. For each sample, 4 or 5 specimens were tested and the average values reported. Hardness of samples was determined with a Durometer Type A or Type D at room temperature.

Viscosity Measurement

A Brookfield viscometer was used and the viscosity was measured at a specified temperature.

The mechanical properties of representative polyurethane sheets made from different polybutadienes polyols and an isocyanate are listed in Table 1. With no branched components in Krasol polyols, the polyurethanes derived from them show strong improvement in elongation, tensile, and tear strength compared to the gum stock derived from B-3. On the other hand, the modulus is decreased for the polyurethanes derived from polyols of the (A) type polybutadienes compared to those from the (B) type polybutadienes as the elevated crosslinking density increases the modulus for the latter.

One would expect the mechanical properties of the polyurethanes derived from the blends of the (A) type and the (B) type to fall in a linear fashion in between those of the polyurethanes made from (A) or (B) alone. However, the properties of the polyurethanes made from the polyol blends surprisingly do not follow a linear relationship with respect to the polyol ratios in the blends polyol as demonstrated in the following Tables 2–4. For example, a 50/50 blend of B-3 and A-2 exhibits the same high modulus as the B-3 (253 vs. 264 psi), but has much higher tensile strength at break (172 vs. 98 psi) and much higher tear strength (54.7 vs. 23.6 lbf/in).

TABLE 2

Physical Properties of Polyurethanes Derived from the Blends of B-3 and A-2 (Ex. 5, 6, 7 represent invention)

| | Example | | | | |
|---|---|---|---|---|---|
| | 1 | 5 | 6 | 7 | 2 |
| Composition (B-3/A-2, wt./wt.) | 100/0 | 75/25 | 50/50 | 5/75 | 0/100 |
| Tensile strength at break (psi) | 97.8 | 165.7 | 172.4 | 211.7 | 405.4 |
| Elongation at break (%) | 58.5 | 117.9 | 178.0 | 408.5 | 758.0 |
| Modulus (psi) | 264.1 | 309.3 | 252.0 | 188.5 | 102.7 |
| Tear strength (lbf/in) | 23.6 | 33.2 | 54.7 | 63.8 | 67.2 |
| Hardness, Shore A | 49 | 52 | 51 | 48 | 51 |

TABLE 3

Physical Properties of Polyurethanes Derived from the Blends of B-3 and A-3 (Ex. 8, 9, 10 represent invention)

| | Example | | | | |
|---|---|---|---|---|---|
| | 1 | 8 | 9 | 10 | 3 |
| Composition (B-3/A-3, wt./wt.) | 100/0 | 75/25 | 50/50 | 25/75 | 0/100 |
| Tensile strength at break (psi) | 97.8 | 158.8 | 158.6 | 178.0 | 173.4 |
| Elongation at break (%) | 58.5 | 108.7 | 136.8 | 262.2 | 400.2 |
| Modulus (psi) | 264.1 | 306.7 | 266.7 | 217.3 | 211.0 |
| Tear resistance (lbf/in) | 23.6 | 30.0 | 37.5 | 59.4 | 75.0 |
| Hardness (Shore A) | 49 | 52 | 51 | 49 | 49 |

TABLE 4

Physical Properties of Polyurethanes Derived from the Blends of B-3 and A-4 (Ex. 11, 12, 13 represent invention)

| | Example | | | | |
|---|---|---|---|---|---|
| | 1 | 11 | 12 | 13 | 4 |
| Composition (B-3/A-3, wt./wt.) | 100/0 | 75/25 | 50/50 | 25/75 | 0/100 |
| Tensile strength at break (psi) | 97.8 | 134.9 | 146.4 | 141.9 | 246.5 |
| Elongation at break (%) | 58.5 | 78.7 | 123.7 | 257.2 | 1004.1 |
| Modulus (psi) | 264.1 | 296.0 | 277.2 | 176.9 | 135.3 |
| Tear resistance (lbf/in) | 23.6 | 28.9 | 34.0 | 48.0 | 66.8 |
| Hardness (Shore A) | 49 | 52 | 50 | 44 | 44 |

The mixture of (A) and (B) of the invention results in formation of polyurethanes with increased thermoplastic properties as well as improved properties to formulations prepared from, or comprising, and the prepolymers prepared therefrom and the cured resins from such mixture's prepolymers. Other properties can include improved tackiness of resulting urethanes, extended pot life of 2-component urethane formulations, and extend shelf life in hot-melt adhesive formulations.

The polybutadiene polyol mixtures (A) and (B) reduce the usage of isocyanates, which are usually the costly and hazardous components, when making prepolymers compared to usage required by prepolymers made from the branched polybutadiene resins (B) alone. For example, the prepolymers used for the formulation of insulated glass sealants requires fast setting and low concentration of hydroxyl functionality. The mixtures of (A) and (B) of the invention possess not only lower number of hydroxyl functionalities per molecule than (B) alone, but also maintain the gelling speed with polyisocyanates achieved by (B) alone.

The incorporation of the polyol blends of the invention improves thermoplastic properties of polyester, polycarbonate, or polyamide copolymers. Use of the mixtures of the invention optimizes the melt and impact strength of the resulting polyester/polybutadiene, polycarbonate/polybutadiene or polyamide/polybutadiene copolymers. Further, the crosslinking density in the reaction product between the polyol mixtures and anhydride-containing monomer or oligomers, such as malenized polybutadiene, poly(styrene-maleic anhydride), ethylene-acrylate-maleic anhydride copolymer is controlled. As a result, the hardness and electric properties of the resulting thermoset materials are optimized as less polar functionalities are present in the final products.

In addition to giving an optimized hydroxyl functionality, which has a strong effect on crosslinking density, the polyol blends of the invention have a range of mixture microstructures of the unsaturated double bond distribution. The branched, free-radical polymerized (B) type resin contains mainly the trans double bond (60%) and relatively low 1,2 vinyl content (approximately 20%). On the other hand, the linear, anionic polymerized (A) type contains predominantly 1,2-vinyl unsaturation (65%), which favors peroxide curing. Thus, the mixture of polyols (A) and (B) have desirable unsaturation distribution (ranging from about 20 to about 65%) to accommodate specified applications.

Another advantage in reducing crosslinking density of the resulting thermoset material is the increased capability of the thermoset matrix to compatibilize additives, such as plasticizers, stabilizers, antioxidants, and fragrances.

Prepolymer Viscosity from Blends of the Invention

Three blended resins with different weight/weight ratios of B-3/A-2 were prepared. Their composition and concentration of the hydroxyl end groups are listed in Table 5. B-3 (Ex. 1) represents the prior art.

TABLE 5

Characterization of Poly bd Resins

| | Example | | | |
|---|---|---|---|---|
| | 1 | 4 | 5 | 6 |
| Composition (B-3/A-2, wt./wt.) | 100/0 | 75/25 | 50/50 | 25/75 |
| Average hydroxyl functionality per chain | 2.50 | 2.33 | 2.15 | 1.98 |
| Hydroxyl value (meq/g) | 0.85 | 0.87 | 0.89 | 0.90 |
| Hydroxyl number, mg KOH/g | 47.6 | 48.7 | 49.8 | 50.4 |

Viscosity and Stability of Prepolymer Viscosity from B-3/A-2 Blends compared to B-3 Alone Prepolymers prepared from B-3 alone, i.e., the prior art, require a large excess of MDI to keep the viscosity of the prepolymer at a workable level. The viscosity of the final prepolymer is determined by the NCO/OH ratio, the molecular weight, and the functionality of the polyol and MDI used under the assumption that the reaction is carried out to completion. Polyurethane prepolymers made from modified MDI and B-3/A-2 blends have lower viscosity than those from B-3 of the same NCO index. With NCO index of 2.5, the viscosity of the prepolymers made from B-3 is too high to measure. For higher NCO indices, the prepolymer viscosity decreases as the hydroxyl functionality per chain in the polyols decreases. These results are expected, as less branch points in the low functionality Poly bd resin renders their prepolymers less gel-like. Thus, the usage of isocyanate monomer can be reduced with low functionality Poly bd resin in preparing prepolymers that have a workable viscosity.

A problem in the prior art was that the viscosity of a prepolymer increases during storage owing to water contaminants or various side reactions. Thus, the prepolymers prepared above were stored for a month to monitor their stability.

The results from the stability study are shown below. Although the viscosity increased somewhat for all prepolymer compositions after storage at room temperature for a month, the one derived from the invention, 25% B-3/75% A-2, was still the most "stable" prepolymer composition.

Prepolymers From Polybutadiene Resins And Blends (Examples 14–17)

Procedure for Preparing Prepolymers.
1. To a one-liter resin kettle were charged polyol(s) and BHT. The mixture was degassed and dehydrated in vacuo (<10 mm Hg) for 0.75 hr at 100° C. with stirring. The system was cooled, and then vented with nitrogen purge. Isonate 143L was added to the flask at 40±5° C. under N2. The resulting mixture was stirred at 40° C. for 20 minutes and then at 70° C. for 4 hrs to complete the reaction.
2. After cooling, the prepolymer was placed in a sealed jar under nitrogen.
3. The viscosity of the prepolymer was determined at 40° C. after the prepolymer was thermally equilibrated in an oven of 40° C. for 3 hours.

TABLE 5A

Brookfield viscosity (cps) of prepolymers at 40° C. before and after one-month storage at room temperature.

| Composition of polyol(s) | NCO/OH | Viscosity (cps) 40° C. (before) | 40° C. (after) |
|---|---|---|---|
| Example 14 | 3.0 | 123,000 | 442,400 |
| B-3 | 4.0 | 31,200 | 50,000 |
|  | 5.0 | 13,600 | 15,400 |
|  | 6.0 | 7,600 | 10,600 |
| Example 15 | 3.0 | 60,400 | 118,400 |
| B-3/A-2 (75/25) | 4.0 | 20,600 | 32,800 |
|  | 5.0 | 10,400 | 14,200 |
|  | 6.0 | 6,800 | 8,400 |
| Example 16 | 2.5 | 109,500 | 151,400 |
| B-3/A-2 (50/50) | 3.0 | 41,200 | 74,200 |
|  | 4.0 | 15,700 | 21,400 |
|  | 5.0 | 7,400 | 9,100 |
|  | 6.0 | 4,900 | 5,400 |
| Example 17 | 2.5 | 56,800 | 71,400 |
| B-3/A-2 (25/75) | 3.0 | 31,800 | 40,800 |
|  | 4.0 | 11,400 | 17,200 |
|  | 5.0 | 5,800 | 8,200 |
|  | 6.0 | 3,800 | 4,300 |

Two-Step Urethane Elastomer from Prepolymers and D-1

The prepolymers prepared from (B) type and mixtures of (A) and (B) type resins reacted with C-1 diisocyanate were chain-extended with 2-ethyl-1,3-hexandiol (D-1) to complete curing. The physical properties of the resultant cured polyurethane sheets with and without dibutyltin dilaurate (DBTDL) catalyst were also compared. The "thermoplastic" properties of those urethane elastomers were strongly enhanced by the presence of the (A) type component, especially for those derived from the prepolymers of relatively low NCO index. In general, the modulus was decreased, and the tensile strength and elongation at break were increased in the cured urethane sheets as the polyol with decreasing hydroxyl functionality in the prepolymer formulations was used. The trend became less distinctive as more C-1 was used in the prepolymer preparation. Having more isocyanate in the prepolymer requires more chain extender to maintain the NCO index for final curing. As a result, the increase of the hard segments offset the effect manifested by the branched and non-branched polybutadiene soft segments.

The mechanical properties of the cured polyurethane sheets (Tables 6–13) depend on the relative amount of short-chain diol, i.e., extender, and ratio of (B) and (A) types in the polyol mixtures.

Examples 18–49

Two-Step Urethane Elastomers from Prepolymers and 2-Ethyl-1,3-Hexandiol

Procedures for Preparing Urethanes via Two-step Process.
1. B-3 or a B-3/A-2 mixture was charged into a resin kettle, followed by degassing and dehydrating in vacuo (<10 mm Hg) at 80° C. with stirring for 1.5 h.
2. Isonate 143L was added to the kettle at 45° C. with stirring. Reaction was maintained for 3 hrs at 75° C. under N2. After the reaction was finished, the resulting prepolymer was degassed in vacuo.
3. To a centrifuge cup were charged the degassed prepolymer and 2-ethyl-1,3-hexandiol, according to the ratio in the formulations listed in the text above.
4. The mixture was mixed with a speed-mixer for 50 s at 1200 rpm.
5. DBTDL (1 drop, about 0.003 g) was added to the cup, and then the mixture was mixed by the speed-mixer for 15 s at 1200 rpm. The final mixture was poured onto a warm (ca. 50° C.) mold (10"×5"×⅛") and cured at 75° C. for 2.5 h, then at 50° C. for overnight. All the samples were aged at least one week at room temperature before being tested for physical properties.

TABLE 6

(Comparative) Two-Step Urethane Elastomers from B-3/C-1 Prepolymer and D-1 with DBTDL

|  | Example | | | |
|---|---|---|---|---|
|  | 18 | 19 | 20 | 21 |
| % Free NCO of prepolymer | 5.07 | 6.08 | 7.00 | 8.64 |
| NCO/OH index for elastomer |  | 1.05 | | |
| Formulation (pbw) | | | | |
| B-3 prepolymer | 100 | 100 | 100 | 100 |
| D-1 | 8.67 | 10.39 | 11.97 | 14.77 |
| Dibutyltin dilaurate (DBTDL), drop | 1 | 1 | 1 | 1 |
| Physical properties of elastomer | | | | |
| Tensile strength (psi) | 1233 | 1703 | 2169 | 2360 |
| Modulus (psi) | 2971 | 6710 | 12039 | 22193 |
| Elongation (%) | 252 | 252 | 258 | 185 |
| Tear resistance (lbf/in) | 209 | 283 | 330 | 406 |
| Hardness, Shore D | 36 | 44 | 48 | 56 |
| Hardness, Shore A | 86 | 92 | 94 | 98 |

TABLE 7

(Comparative) Two-Step Urethane Elastomers from B-3/C-1 Prepolymer and D-1 without DBTDL

|  | Example Number | | | |
|---|---|---|---|---|
|  | 22 | 23 | 24 | 25 |
| % Free NCO of prepolymer | 5.07 | 6.08 | 7.00 | 8.64 |
| NCO/OH index for elastomer |  | 1.05 | | |

TABLE 7-continued (Comparative) Two-Step Urethane Elastomers from B-3/C-1 Prepolymer and D-1 without DBTDL

| | Example Number | | | |
|---|---|---|---|---|
| | 22 | 23 | 24 | 25 |
| Formulation (pbw) | | | | |
| B-3 prepolymer | 100 | 100 | 100 | 100 |
| D-1 | 8.67 | 10.39 | 11.97 | 14.77 |
| Dibutyltin dilaurate (DBTDL), drop | None | | | |
| Physical properties of elastomer | | | | |
| Tensile strength (psi) | 1536 | 1778 | 2279 | 3160 |
| Modulus (psi) | 2481 | 4909 | 8399 | 15950 |
| Elongation (%) | 296 | 256 | 268 | 272 |
| Tear resistance (lbf/in) | 226 | 278 | 324 | 393 |
| Hardness, Shore D | 35 | 45 | 48 | 56 |
| Hardness, Shore A | 87 | 92 | 95 | 98 |

TABLE 8

(Invention) Two-Step Urethane Elastomers from B-3/A-2 (75/25)/C-1 Prepolymer and D-1 with DBTDL

| | Example Number | | | |
|---|---|---|---|---|
| | 27 | 27 | 28 | 29 |
| % Free NCO of prepolymer | 5.20 | 6.22 | 7.16 | 8.81 |
| NCO/OH index | 1.05 | | | |
| Formulation (pbw) | | | | |
| B-3/A-2 (75/25) C-1 prepolymer | 100 | 100 | 100 | 100 |
| D-1 | 8.89 | 10.63 | 12.24 | 15.05 |
| Dibutyltin dilaurate (DBTDL), drop | 1 | 1 | 1 | 1 |
| Physical properties of elastomer | | | | |
| Tensile strength, (psi) | 1570 | 1857 | 2579 | 2944 |
| Modulus, (psi) | 2370 | 4636 | 8052 | 21544 |
| Elongation, (%) | 344 | 286 | 345 | 302 |
| Tear resistance, (lbf/in) | 206 | 288 | 320 | 465 |
| Hardness, Shore D | 38 | 46 | 49 | 60 |
| Hardness, Shore A | 84 | 91 | 94 | 97 |

TABLE 9

Two-Step Urethane Elastomers from B-3/A-2 (75/25)/C-1 Prepolymer and D-1 without DBTDL

| | Example Number | | | |
|---|---|---|---|---|
| | 30 | 31 | 32 | 33 |
| % Free NCO of prepolymer | 5.20 | 6.22 | 7.16 | 8.81 |
| NCO/OH index | 1.05 | | | |
| Formulation (pbw) | | | | |
| B-3/A-2 (75/25) prepolymer | 100 | 100 | 100 | 100 |
| D-1 | 8.89 | 10.63 | 12.24 | 15.05 |
| Dibutyltin dilaurate (DBTDL), drop | None | | | |
| Physical properties of elastomer | | | | |
| Tensile strength (psi) | 1632 | 1913 | 2615 | 2944 |
| Modulus (psi) | 2019 | 3704 | 5716 | 15747 |
| Elongation (%) | 340 | 293 | 341 | 256 |
| Tear resistance (lbf/in) | 216 | 273 | 324 | 401 |
| Hardness, Shore D | 40 | 49 | 49 | 57 |
| Hardness, Shore A | 86 | 91 | 94 | 94 |

TABLE 10

Two-Step Urethane Elastomers from B-3/A-2 (50/50)/C-1 Prepolymer and D-1 with DBTDL

| | Example | | | |
|---|---|---|---|---|
| | 34 | 35 | 36 | 37 |
| % Free NCO of prepolymer | 5.32 | 6.36 | 7.31 | 8.99 |
| NCO/OH index | 1.05 | | | |
| Formulation (pbw) | | | | |
| B-3/A-2 (50/50) prepolymer | 100 | 100 | 100 | 100 |
| D-1 | 9.09 | 10.88 | 12.49 | 15.36 |
| Dibutyltin dilaurate (DBTDL), drop | 1 | 1 | 1 | 1 |
| Physical properties of elastomer | | | | |
| Tensile strength (psi) | 1586 | 2591 | 2619 | 3093 |
| Modulus (psi) | 2498 | 3943 | 8163 | 18670 |
| Elongation (%) | 298 | 396 | 301 | 260 |
| Tear resistance (lbf/in) | 227 | 286 | 362 | 450 |
| Hardness, Shore D | 42 | 47 | 50 | 60 |
| Hardness, Shore A | 87 | 91 | 94 | 99 |

TABLE 11

Two-Step Urethane Elastomers from B-3/A-2 (50/50)/C-1 Prepolymer and D-1 without DBTDL

| | Example Number | | | |
|---|---|---|---|---|
| | 38 | 39 | 40 | 41 |
| % Free NCO of prepolymer | 5.32 | 6.36 | 7.31 | 8.99 |
| NCO/OH index | 1.05 | | | |
| Formulation (pbw) | | | | |
| B-3/A-2 (50/50) prepolymer | 100 | 100 | 100 | 100 |
| D-1 | 9.09 | 10.88 | 12.49 | 15.36 |
| Dibutyltin dilaurate (DBTDL), drop | None | | | |
| Physical properties of elastomer | | | | |
| Tensile strength (psi) | 1766 | 2103 | 2751 | 3292 |
| Modulus (psi) | 1922 | 3042 | 5921 | 13440 |
| Elongation (%) | 337 | 309 | 307 | 277 |
| Tear resistance (lbf/in) | 220 | 279 | 334 | 427 |
| Hardness, Shore D | 40 | 46 | 53 | 57 |
| Hardness, Shore A | 86 | 91 | 94 | 98 |

TABLE 12

Two-Step Urethane Elastomers from B-3/A-2 (25/75)/C-1 Prepolymer and D-1 with DBTDL

| | Example Number | | | |
|---|---|---|---|---|
| | 42 | 43 | 44 | 45 |
| % Free NCO of prepolymer | 4.27 | 5.43 | 7.44 | 9.14 |
| NCO/OH index | 1.05 | | | |
| Formulation (pbw) | | | | |
| B-3/A-2 (25/75) prepolymer | 100 | 100 | 100 | 100 |
| D-1 | 7.30 | 9.27 | 12.72 | 15.62 |
| Dibutyltin dilaurate (DBTDL), drop | 1 | 1 | 1 | 1 |
| Physical properties of elastomer | | | | |
| Tensile strength (psi) | 1725 | 2328 | 3317 | 3742 |
| Modulus (psi) | 849 | 2192 | 9148 | 22797 |
| Elongation, (%) | 424 | 406 | 337 | 281 |
| Tear resistance (lbf/in) | 190 | 250 | 366 | 470 |
| Hardness, Shore D | 36 | 40 | 53 | 59 |
| Hardness, Shore A | 83 | 88 | 96 | 97 |

TABLE 13

Two-Step Urethane Elastomers Derived from B-3/A-2 (25/75)/C-1 Prepolymer and D-1 without DBTDL

| | Example Number | | | |
|---|---|---|---|---|
| | 46 | 47 | 48 | 49 |
| % Free NCO of prepolymer | 4.27 | 5.43 | 7.44 | 9.14 |
| NCO/OH index | | 1.05 | | |
| Formulation (pbw) | | | | |
| B-3/A-2 (25/75) prepolymer | 100 | 100 | 100 | 100 |
| D-1 | 7.30 | 9.27 | 12.72 | 15.62 |
| Dibutyltin dilaurate (DBTDL), drop | | None | | |
| Physical properties of elastomer | | | | |
| Tensile strength, (psi) | 2232 | 2511 | 2802 | 3655 |
| Modulus (psi) | 767 | 1710 | 7027 | 14281 |
| Elongation, (%) | 506 | 413 | 280 | 291 |
| Tear resistance, (lbf/in) | 208 | 249 | 330 | 424 |
| Hardness, Shore D | 36 | 36 | 41 | 55 |
| Hardness, Shore A | 86 | 83 | 85 | 97 |

While the invention has been described and exemplified in detail, various alternatives, modifications and improvements should become apparent to those skilled in this art without departing from the spirit and scope of this invention as set forth in the following claims.

What is claimed is:

1. A reaction product of a composition comprising:
   (A) non-branched polybutadiene having terminal hydroxyl functionality less than 2 per molecule by average; and
   (B) branched polybutadiene having terminal hydroxyl functionality more than 2 per molecule by average;
   the weight ratio of (A) to (B) being about 99:1 to 1:99 with a monomer or polymer (C), the reaction product having one or more hydroxyl, isocyanate, carboxyl, phenol, epoxy, or amine terminal groups.

2. A curable composition comprising the reaction product of claim 1 and one or more chain extending agents.

3. A composition comprising:
   (A) non-branched polybutadiene having terminal hydroxyl functionality less than 2 per molecule by average; and
   (B) branched polybutadiene having terminal hydroxyl functionality more than 2 per molecular by average;
   the weight ratio of (A) to (B) being about 99:1 to 1:99, and a polyfunctional monomer or polymer (C) having functionality which is reactive with the terminal hydroxyl groups of (A) and (B).

4. The composition of claim 3 wherein the polyfunctional monomer or polymer (C) is selected from organic polyisocyanates, polyamides, polyamines, anhydrides of dicarboxylic acids, polyepoxides, and polyesters.

5. A prepolymer which is the reaction product of a composition comprising:
   (A) non-branched polybutadiene having terminal hydroxyl functionality less than 2 per molecule by average; and
   (B) branched polybutadiene having terminal hydroxyl functionality more than 2 per molecule by average;
   the weight ratio of (A) to (B) being about 99:1 to 1:99, with an organic polyisocyanate (C).

6. The prepolymer of claim 5 wherein the organic polyisocyanate (C) is selected from the group consisting of 4,4'-methylenebis(phenyl isocyanate), toluene diisocyanate, and hexane diisocyanate.

7. A curable composition comprising the prepolymer of claim 5 and a chain extending monomer.

8. The curable composition of claim 7 wherein the chain extending monomer is selected from the group consisting of diol and diamine.

9. A direct cured polyurethane composition prepared by reacting a composition comprising:
   (A) non-branched polybutadiene having terminal hydroxyl functionality less than 2 per molecule by average; and
   (B) branched polybutadiene having terminal hydroxyl functionality more than 2 per molecule by average;
   the weight ratio of (A) to (B) being about 99:1 to 1:99, with a polyisocyanate.

10. The composition of claim 9 in a form selected from roof water-resistant membrane, insulated glass sealant, hot melt adhesive, geo-membrane, and liquid binder in brake system.

11. Method of preparing compositions comprising:
    (A) non-branched polybutadiene having terminal hydroxyl functionality less than 2 per molecule by average; and
    (B) branched polybutadiene having terminal hydroxyl functionality more than 2 per molecule by average;
    the weight ratio of(A) to (B) being about 99:1 to 1:99, comprising blending (A) and (B) in a ratio of 99:1 to 1:99 by weight.

12. Method of preparing prepolymers comprising reacting a composition comprising:
    (A) non-branched polybutadiene having terminal hydroxyl functionality less than 2 per molecule by average; and
    (B) branched polybutadiene having terminal hydroxyl functionality more than 2 per molecule by average;
    the weight ratio of (A) to (B) being about 99:1 to 1:99, with organic polyisocyanate, phenol, amine, dianhydride, or peracid.

13. Method of preparing cured thermoplastic resins comprising reacting a prepolymer prepared according to claim 12 with a polyfunctional monomer.

14. Method of preparing a roof water-resistant membrane, insulated glass sealant, hot melt adhesive, geo-membrane, or liquid binder for a brake system comprising reacting a prepolymer prepared according to claim 12 with a polyfunctional crosslinking monomer.

* * * * *